UNITED STATES PATENT OFFICE.

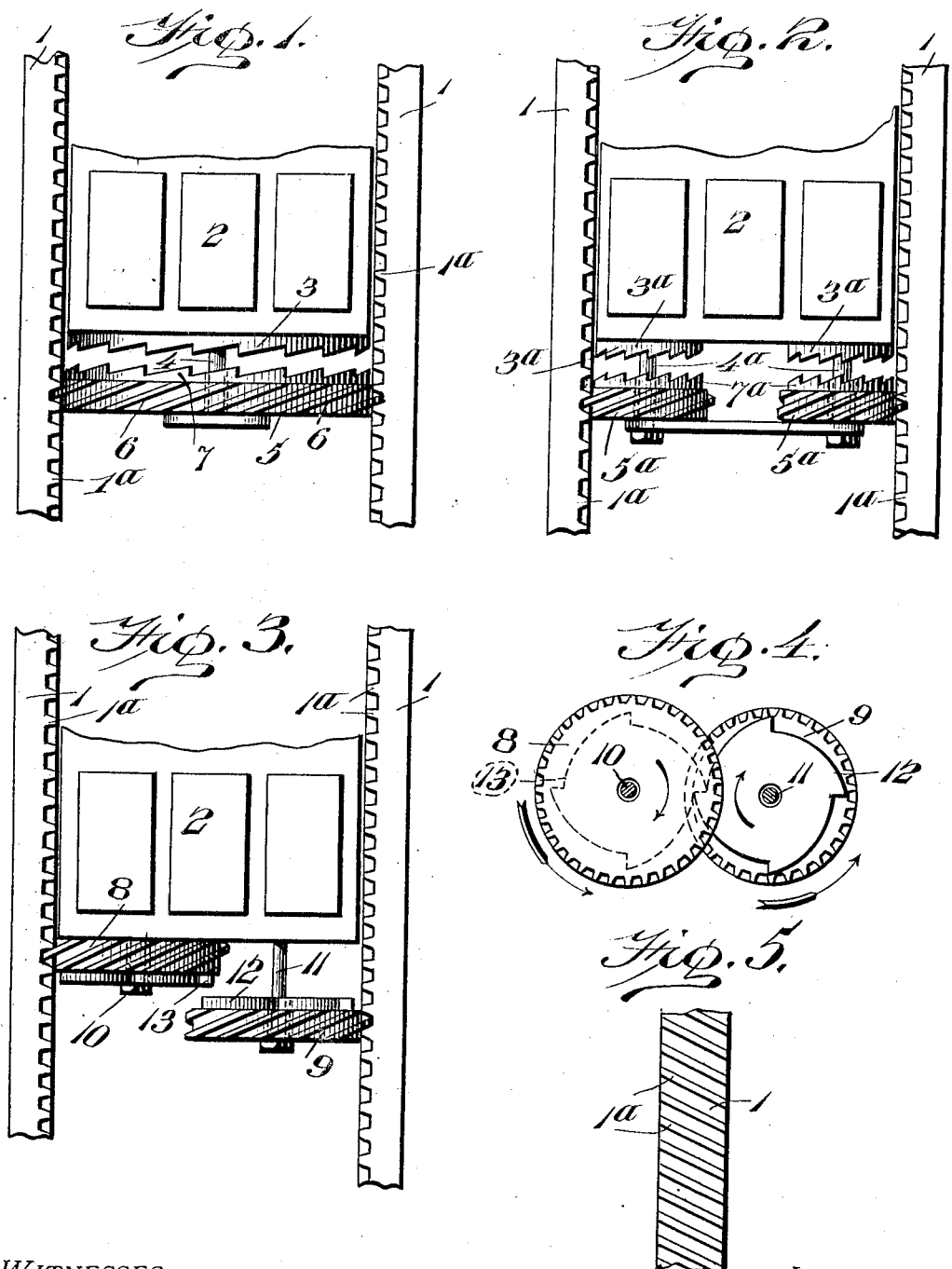

McCLELLAN FULLENLOVE, OF LOUISVILLE, KENTUCKY, ASSIGNOR TO THE FULLENLOVE ELEVATOR COMPANY, OF LOUISVILLE, KENTUCKY, A CORPORATION OF KENTUCKY.

ELEVATOR-BRAKE.

No. 856,576.     Specification of Letters Patent.     Patented June 11, 1907.

Application filed March 13, 1905. Serial No. 249,858.

*To all whom it may concern:*

Be it known that I, McCLELLAN FULLENLOVE, a citizen of the United States, and a resident of Louisville, in the county of Jefferson and State of Kentucky, have invented certain new and useful Improvements in Elevator-Brakes, of which the following is a specification.

This invention relates to elevator brakes. In an application filed by me on August 4, 1904, I have shown a fixed rack, and a spiral traveling with the cage on the fixed rack and movable axially against a conical and frictional braking surface. This type of braking surface is very effective for braking the car, but when it is desired to start the car after it has been braked I have found that a binding action takes place, sometimes making the starting very difficult.

It is therefore an object of this invention to provide a braking surface that will permit the quick raising of the car after a braking action.

A further object is to provide teeth on the traveling spiral and the fixed rack which reduce the friction between said parts.

In the drawings: Figure 1 is one embodiment of my invention showing a single spiral or gear engaging racks on opposite sides of the elevator shaft. Fig. 2 is an embodiment showing two gears having separate braking surfaces. Figs. 3 and 4 show an embodiment having two gears adapted to interlock. Fig. 5 is a detail of one of the fixed racks.

Referring more particularly to the drawings, 1 indicates a pair of racks having teeth 1ª on one side, and 2 indicates the elevator cage.

In all embodiments of my invention, when the speed of the elevator exceeds the speed of the gear or gears, the braking surface on the gear or gears engages the braking surface on the cage, thereby preventing the rotation of the gear or gears and consequently stopping the elevator. These surfaces permit the elevation of the cage and then the rotation of the gear in the other direction but prevent any binding action between the braking surfaces.

In Fig. 1, the bottom of the cage 2 is provided with a toothed braking surface 3 on its under side, while depending from its center is a shaft 4 on which is journaled a gear 5. This gear 5 is shorter in the direction of its axis than in the direction of its diameter and has teeth 6 which do not extend completely around the same. This form of gear is especially adapted to prevent undue friction between the gear and the rack. The gear has a toothed upper face 7 adapted to engage the toothed surface 3 when the gear is moved axially on the shaft 4 due to excessive speed caused by the dropping of the elevator cage or otherwise. The gear 5 meshes with both racks 1 and should the shaft 4 break the gear would be sufficient to support the elevator.

In Fig. 2 two gears 5ª, of the same form as that shown in Fig. 1, are employed. The car 2 is provided with two toothed braking surfaces 3ª while the gears 5ª are provided with upper toothed faces 7ª and are axially movable on shafts 4ª.

In Figs. 3 and 4 two gears 8 and 9 are provided each meshing with one of the racks 1 and of diameters to cause them to overlap one another. Gear 8 is journaled on shaft 10 and is not adapted to move axially. Gear 9 is journaled on shaft 11 below the gear 8 and is adapted to move axially so as to throw its teeth 12 into engagement with teeth 13 on the upper gear, the teeth on both gears being different from the teeth of the other embodiments, yet permitting them to turn in one direction and not in the other as clearly shown in Fig. 4.

Various changes, within the scope of the appended claims, may be made without departing from the spirit or sacrificing any of the advantages of my invention.

Having thus described my invention, what I claim is:

1. In an elevator brake, the combination with a cage and a fixed rack, of a gear moving with the cage, movable axially relatively to the cage and having braking teeth on one face thereof, and a toothed braking surface moving with the cage and against which the braking teeth on the gear may move.

2. In an elevator brake, the combination with the cage and a fixed rack, of a gear moving with the cage, having a toothed braking surface and movable axially relatively to the cage, and a toothed braking surface moving with the cage and positioned to engage the teeth on the gear when the gear moves relatively to the cage due to excessive speed, the teeth being formed to cause the braking surfaces to separate when the cage is moved in the other direction.

3. In an elevator brake, a cage, a pair of fixed racks, one on each side of the cage, a gear carried by the cage movable axially relatively thereto, meshing with both racks, and having a braking surface, and braking surface on the cage against which the braking surface on the gear contacts when the gear moves axially in one direction.

The foregoing specification signed at Louisville Ky this 1st day of Feb, 1905.

McCLELLAN FULLENLOVE.

In presence of—
  E. K. PENNEBAKER,
  LAWRENCE S. LEOPOLD.